United States Patent [19]

Miyake et al.

[11] Patent Number: 4,835,631

[45] Date of Patent: May 30, 1989

[54] APPARATUS FOR CONTROLLING PLAYBACK HEAD TRACKING FOR ROTARY RECORDING MEDIUM USING AVERAGE PEAK ENVELOPE POSITION

[75] Inventors: Izumi Miyake; Kiyotaka Kaneko; Kazuya Oda; Katsuo Nakadai, all of Tokyo, Japan

[73] Assignee: Fuji Photo Film Co., Ltd., Kanagawa, Japan

[21] Appl. No.: 938,042

[22] Filed: Dec. 4, 1986

[30] Foreign Application Priority Data

Dec. 5, 1985 [JP] Japan .............................. 60-272542
Dec. 5, 1985 [JP] Japan .............................. 60-272543
Dec. 5, 1985 [JP] Japan .............................. 60-272544

[51] Int. Cl.$^4$ .................... G11B 5/596; G11B 21/10
[52] U.S. Cl. ............................ 360/77.04; 360/77.06; 369/43
[58] Field of Search ................ 360/77, 78; 369/43, 369/44

[56] References Cited

U.S. PATENT DOCUMENTS

| | | | |
|---|---|---|---|
| 4,087,842 | 5/1978 | Manly | 360/77 |
| 4,142,209 | 2/1979 | Hedlund et al. | 360/77 |
| 4,149,199 | 4/1979 | Chick et al. | 360/77 |
| 4,205,338 | 5/1980 | Schaefer | 360/77 |
| 4,247,741 | 1/1981 | Tatsuguchi et al. | 360/77 |
| 4,334,276 | 6/1982 | Turnbull | 360/77 |
| 4,365,324 | 12/1982 | Michaelis | 360/77 |
| 4,445,153 | 4/1984 | Fujimoto et al. | 360/77 |
| 4,485,418 | 11/1984 | Bremmer | 360/77 |
| 4,628,379 | 12/1986 | Andrews, Jr. et al. | 360/77 |

OTHER PUBLICATIONS

"Disk Runout Accommodation", IBM Technical Disclosure Bulletin, vol. 21, No. 7, Dec. 1978, pp. 2688-2691, J. P. Mantey.

Primary Examiner—Alan Faber
Assistant Examiner—David L. Robertson
Attorney, Agent, or Firm—Birch, Stewart, Kolasch & Birch

[57] ABSTRACT

A device for tracking a rotary recording medium includes a playback head for reading a signal from any of a plurality of tracks which are formed on the rotary recording medium, which is rotating at a predetermined constant speed, such that a beginning and an end of a recording in each of the tracks coincide with each other, a head support mechanism supporting the head such that the head is movable along the recording medium, an arrangement for detecting an envelope of a signal which is read out of the recording medium by the head, and a controller for controlling the head support mechanism to move the head to a position where a desired one of the tracks is located. An arrangement for detecting a position of the head relative to the recording medium and an arrangement for detecting a rotation phase of the recording medium are provided. The controller controls the head support mechanism to transport the head, while the position detecting arrangement during transport of the head detects positions of the head at which a peak of an envelope is detected in one track at each of a plurality of angles of rotation of the recording medium. The controller produces a means position of those positions of the head detected and, then, controls the head support mechanism to transport the head to the mean position.

10 Claims, 8 Drawing Sheets

APPARATUS FOR CONTROLLING PLAYBACK HEAD TRACKING FOR ROTARY RECORDING MEDIUM USING AVERAGE PEAK ENVELOPE POSITION

BACKGROUND OF THE INVENTION

1. Field of the Invention

The present invention relates to a tracking device installed in an apparatus for playing back a rotary recording medium, especially an apparatus of the type reproducing video signals and other data signals which are recorded on a rotary magnetic recording medium such as a magnetic disk.

2. Description of the Prior Art

A recent achievement in the realm of the imaging art is an electronic still camera system which uses in combination a solid state imaging device, an imaging tube or like image pick-up device, and a recording apparatus of the kind using a magnetic disk which is a relatively inexpensive and large-capacity recording medium. In an electronic still camera system, while a subject is picked up purely electronically by an image pick-up device in the form of a still picture to be recorded on a rotary disk by a recording apparatus, the picture is reproduced whenever desired by means of a television system, a printer or the like which is independent of the recording apparatus.

A rotary magnetic recording medium applicable to such an electronic still camera system, for example, may comprise a disk which has a diameter as small as about 50 millimeters and accommodates fifty concentric tracks at a track pitch of about 100 microns, i.e. with a track width of about 50 to 60 microns and a guard band width of about 50 to 40 microns. Loaded on a recording or a playback apparatus, the disk is rotated at a constant speed of, for example, 3,600 revolutions per minute so that a video signal is recorded on or reproduced out of the disk on a field or a frame basis.

A problem with a recording medium, especially a magnetic disk, which is applicable to magnetic recording as stated above is that tracking errors are apt to occur due to various causes such as compatibility, eccentricity and thermal expansion of the medium. Specifically, it often occurs that a magnetic playback head of a playback apparatus partially scans a track of the disk which is positioned next to a desired track, bringing about crosstalk between the nearby tracks.

To solve the above-described crosstalk problem, there has been proposed a system in which a magnetic record head is caused to record a tracking signal under the application of tracking servo, while tracking servo is applied to a magnetic playback head by utilizing the tracking signal. However, it is impractical for a tracking servo mechanism which needs utmost accuracy of control to be built in a camera and other recording instruments which are lightweight and of a compact size.

In light of the above situation, a recording system may be implemented with a guard band system or a frequency-modulation (FM) azimuth system. Such a recording system is effective to compensate for some degrees of tracking errors during playback by preventing a playback head from scanning a track other than and next to a desired one or, if it failed to do so, preventing it from picking up a signal from the nearby track.

Tracking control by envelope peak detection is another approach known in the art. In accordance with this kind of control, a record head is transported through each predetermined track pitch by a stepping motor without any tracking servo applied thereto. A playback head, on the other hand, is applied with tracking servo by detecting an envelope of a signal which is stored in each track and, based on a peak of the envelope, identifying an optimum track.

The head position at which the envelope shows a peak is determined by transporting a magnetic head over a predetermined pitch, then reading an envelope value at that position, and then comparing it with an envelope value which was detected at a previous head position.

For the comparison stated above, a digital processing system is advantageously used. In this condition, a video signal sensed by a magnetic playback head is subjected to envelope detection, and the resulting envelope output is fed to a digital processing system after being converted into a digital value by an analog-to-digital converter. Advantageously, only those envelope levels which exceed a predetermined threshold level are used for the comparison so that the detection may be freed from errors due to noise and other disturbances to the system.

The tracking control by envelope detection as discussed above in which tracking is performed by detecting a peak of an envelope at any desired or predetermined rotational phase angle of a magnetic disk still has a problem left unsolved. Specifically, should a magnetic disk loaded on a playback apparatus be eccentric, i.e., should the center of rotation of a magnetic disk be offset from the center of the circle of a track recorded, a playback head would not always remain on-track throughout the rotation of the disk and might become deviated from a position representative of the peak of the envelope and thus fail to reproduce information accurately from the track.

SUMMARY OF THE INVENTION

It is an object of the present invention to eliminate the drawbacks inherent in the prior art schemes as discussed above and provide a tracking device which allows a rotary recording medium to be tracked with accuracy despite any possible eccentricity of the medium.

In accordance with the present invention, a device for tracking a rotary recording medium is provided which includes a playback head for reading a signal out of any of a plurality of tracks which are formed on the rotary recording medium which is rotating at a predetermined constant speed, such that a beginning and an end of a recording in each of the tracks coincide with each other, a head support mechanism supporting the head such that the head is movable along the recording medium, an arrangement for detecting an envelope of a signal which is read out of the recording medium by the head, and a controller for controlling the head support mechanism to move the head to a position where a desired one of the tracks is located. An arrangement for detecting a position of the head relative to the recording medium and an arrangement for detecting a rotation phase of the recording medium are provided. The controller controls the head support mechanism to transport the head, while the position detecting arrangement during transport of the head detects positions of the head at which a peak of an envelope is detected in one track at each of a plurality of angles of rotation of the recording medium. The controller produces a mean position of those positions of the head detected and, then, controls the head support mechanism to transport the head to the mean position.

In the instant specification, it should be born in mind that the words "tracks each formed such that the beginning and the end of a recording coincide with each other" imply that each of the tracks is formed without changing the position of a record head relative to a rotary magnetic recording medium, as typified by tracks which are formed on a magnetic disk concentrically about an axis of rotation and parallel tracks which are formed circumferentially on a magnetic drum.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENT

A preferred embodiment of the device for tracking a rotary recording medium in accordance with the present invention will be described in detail with reference to the accompanying drawings.

Figure 1:
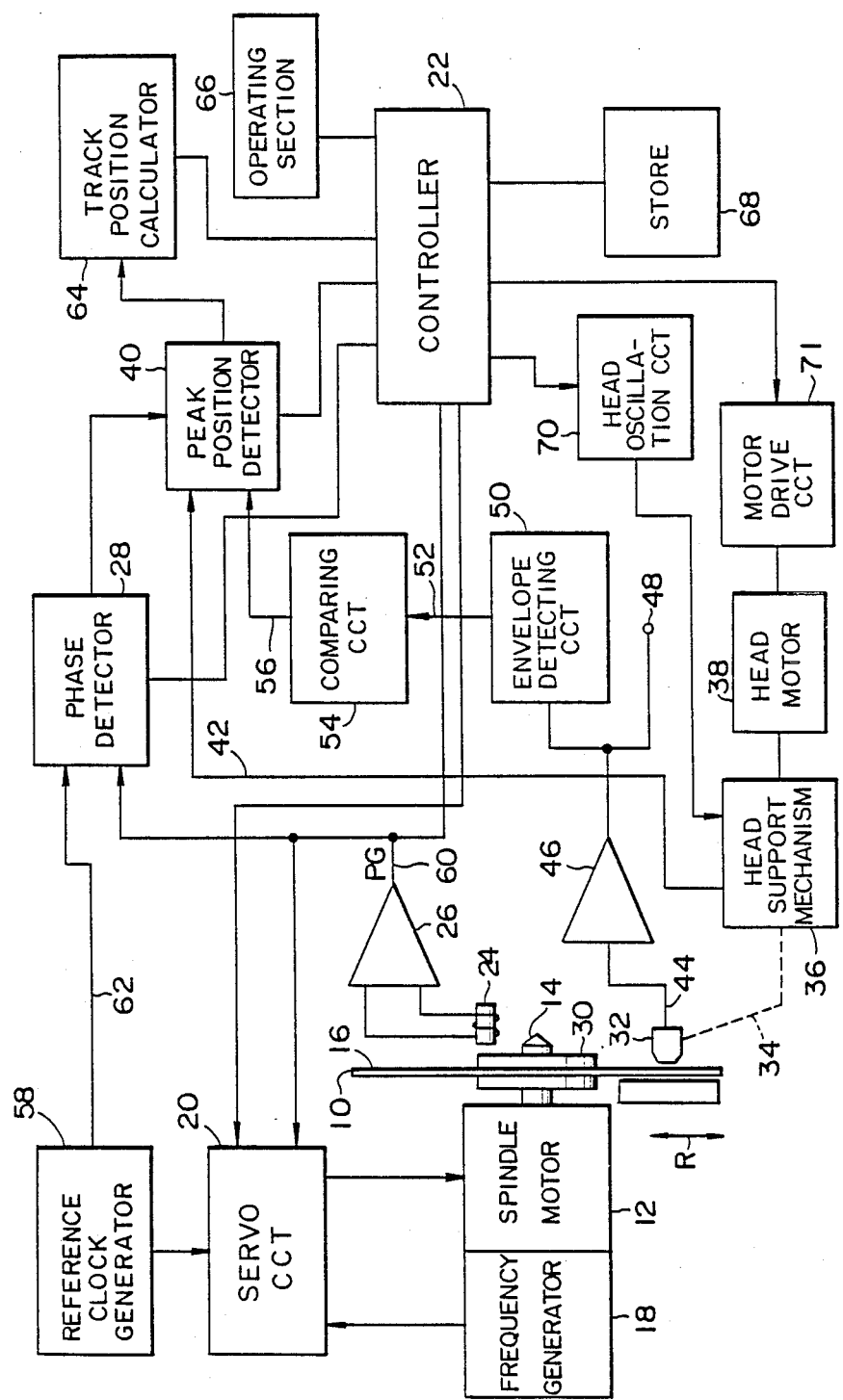
FIG. 1 is a schematic block diagram showing a device for tracking a rotary recording medium in accordance with the present invention.

Referring to FIG. 1 of the drawings, there is shown a rotary recording medium 10 which in this particular embodiment is a magnetic disk. This disk 10 is detachably mounted on a spindle 14 which is driven by a spindle motor 12. The disk 10 has a sheet of magnetic recording material on a recording surface 16 thereof with a plurality of concentric recording tracks, at a pitch of about 100 microns. The disk may contain fifty tracks, for example. In this embodiment, a signal recorded on the track comprises such a video a color video signal which is made up of a luminance signal and a chroma signal which are frequency modulated. A field video signal, for example, which completes one field of a picture may be recorded on one track in a raster scanning fashion.

The spindle motor 12 is provided with a frequency generator 18 which is adapted to generate an AC (alternating current) frequency signal. The motor 12 is powered and servo-controlled by a servo circuit 20 to rotate the disk 10 at a predetermined constant speed, e.g. 3,600 revolutions per minute. The servo circuit 20 is connected to a controller 22 which functions to control the entire tracking device. A reference clock generator 58 generates a first reference clock which is applied to the servo circuit 20 for the servo control as mentioned above, and a second reference clock which is applied to a phase detecting section, or phase detector, 28. In the illustrative embodiment, while the first reference clock fed to the servo circuit 20 has a frequency of 60 hertz which is the same as the field frequency of the raster scanned video signals which may be recorded in the disk 10, the second reference clock fed to the phase detector 28 has a higher frequency than the first reference clock, e.g. 3.58 megahertz.

A phase generating section, or phase generator, 24 is located in a predetermined position adjacent to the recording surface 16 of the disk 10. The phase generator 24 is connected to an amplifier 26 an output of which is coupled to the servo circuit 20 and the controller 22. In this construction, a timing mark which is provided at a predetermined position on a core 30 of the disk is sensed by the phase generator 24 with the result that a timing pulse PG is produced at the output of amplifier 26.

A magnetic transducer, or head, 32 is disposed above the recording surface 16 of the disk 10. As schematically represented by a dotted line 34, the head 32 is mounted on a head support mechanism 36. Driven by a head motor 38, the support mechanism 36 transports the head 32 along the recording surface 16 of the disk 10 as indicated by a double-headed arrow R, i.e., in both directions along the radius of the recording surface 16, so that a desired track on the surface 16 may be selected.

The head support mechanism 36 is connected to a peak position detecting section, or peak position detector, 40 so as to feed a radial signal representative of a position of the head 32 on the recording surface 16 to an input 42 of the peak position detector 40. This part of the construction will be described later in detail.

While the head 32 may perform a magnetic recording function, in this particular embodiment it is assumed to have a playback function for sensing a video signal from a track previously recorded on the disk 10 and converting it into an electric signal. In this embodiment, because the disk 10 is rotated at a constant speed of 3,600 revolutions per minute as previously stated, the head 32 reproduces one track of video signal, i.e., one field of FM video signal per rotation of the disk 10, i.e., 1/60 second. The one field of FM video signal is demodulated to adapt itself to a standard color television format such as the NTSC system.

An output 44 of the head 32 is coupled to a video signal output terminal 48 and an envelope detection circuit, or envelope detector, 50 via preamplifier 46. An output device which is to use the video signal may be connected to the video signal output terminal 48.

The envelope detector 50 functions to detect an envelope of the FM video signal read from the recording surface 16 of the disk 10 by head 32 and delivers to an output 52 a voltage which corresponds to the envelope detected. The output 52 is connected to a comparison circuit, or comparator, 54 an output 56 of which is in turn connected to the peak position detector 40.

The comparator 54 is adapted to compare the input 52 from the envelope detector 50 with a predetermined reference voltage and, when the former exceeds the latter, produces a signal accordingly. The reference voltage is selected to correspond to a minimum value of an envelope which is indicative of a video signal being stored in the recording surface 16 of the disk 10.

The phase detector 28 serves to detect a rotation angle, or phase, of the disk 10 from a reference position thereof, i.e., a position at which a timing signal PG is generated, in response to a timing pulse PG which is applied to the input 60 from the phase generator 24 and the reference signal which is applied to the input 62 from the reference clock generator 58. The peak position detector 40 is adapted to detect a position of the head 32 which is representative of a peak of an envelope, i.e., a peak position in response to position data on the head 32 produced by the head support mechanism 36, a value of an envelope developed by the comparator 54, and rotation phase data on the disk 10 provided by the phase detector 28.

The tracking device further includes a track position calculating section, or track position calculator, 64 which functions to calculate an optimum track position by a predetermined arithmetic operation on the basis of a peak position which is detected by the peak position detector 40.

The functional sections 28, 40 and 64 as stated above are controlled by the controller 22 and may advantageously be implemented by a microprocessor or like processing system inclusive of the controller 22. In that case, needless to mention, those functional sections 28, 40 and 64 are interfaced to other circuit elements by analog-to-digital converters, digital-to-analog converters or amplifiers, by way of example.

Interconnected to the controller 22 is an operating section 66 through which an operator may enter various commands. Another role assigned to the operating section 66 is displaying various conditions of the system. In response to a command entered on the operating section 66, the controller 22 controls and supervises the entire device. The commands which may be inputted on the operating section 66 include commands for starting and stopping the operation of the device, a command for designating a desired track position, a command for moving the head 32 to a desired track position, a command for moving the head 32 forwardly with respect to the track number (e.g. from a radially outer track to a radially inner track), and a command for moving the head 32 in the opposite or reverse direction.

Also interconnected to the controller 68 is a storing section, or store, 68 which is available for the calculation of a track position as well as for various kinds of arithmetic operations and controls.

In this particular embodiment, the head motor 38 is implemented by a DC motor and supplied by a motor drive circuit, or motor driver, 71. The controller 22 controls the rotation of the motor 38 to thereby transport the head 32 as indicated by the arrow R by each predetermined unit length.

Figure 2:
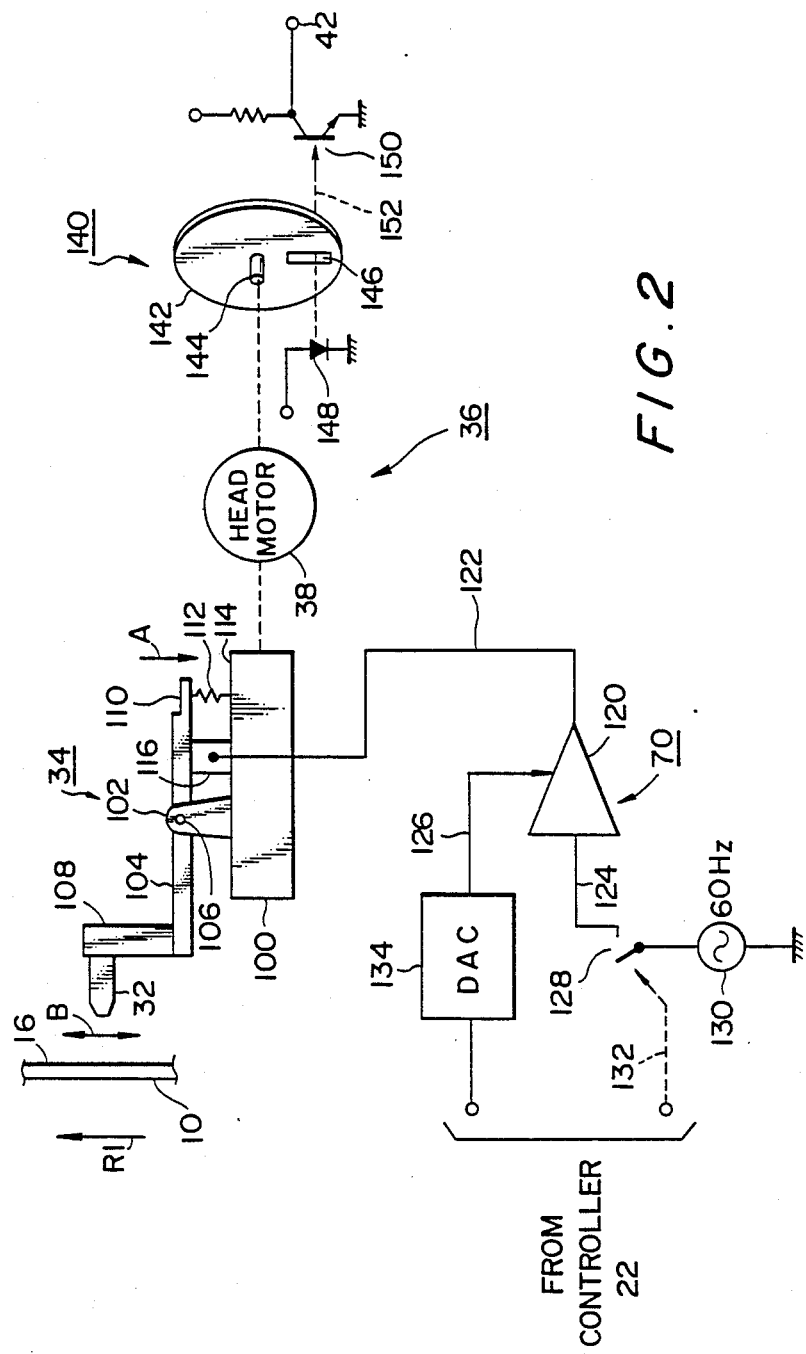
FIG. 2 is a schematic view of a magnetic head support mechanism of the tracking device as shown in FIG. 1 as well as sections associated therewith.

Referring to FIG. 2, the head support mechanism 36 is shown in a schematic view. As shown, the mechanism 36 includes a carriage 100 which is driven by the head motor 38 to move in the radial direction R of the recording surface 16 of the disk 10. A support member 102 is rigidly mounted on the carriage 100 while an arm 104 is supported by the support member 102 to be rotatable about a shaft 106. A head mount 108 is fixed to one end of the arm 104 and carries the head 32 thereon. A spring 112 is anchored at one end thereof to the other end 110 of the arm 104 and at the other end thereof to the carriage 100, whereby the end 110 of the arm 104 is constantly biased in a direction indicated by arrow A in FIG. 2.

A piezoelectric device 116 is interposed between the arm 104 adjacent to the end 110 and a major surface 112 of the carriage 100. A head oscillating circuit 70 includes an amplifier 120 an output 122 which is electrically interconnected to the piezoelectric device 116.

The piezoelectric device 116 is supplied with a drive voltage from the amplifier 120 to generate a mechanical displacement corresponding to the drive voltage, thereby causing the arm 104 into a small angular motion about the shaft 106.

The amplifier 120 of the circuit 70 comprises a variable gain amplifier whose gain is controllable in response to a control input 126. A power supply 130 is interconnected via a switch 128 to a signal input 124 of the amplifier 120. In this embodiment, the power supply 130 may advantageously be implemented by a power supply which produces a sinusoidal wave signal whose frequency is substantially equal to that of the field frequency of a video signal which is stored in the disk 10, i.e. 60 hertz. The switch 128 is a normally open switch and controlled by the controller 22 as schematically indicated by a dotted line 132. A signal for setting a gain of the amplifier 120, also produced by the controller 22, is routed to the control input 126 by way of a digital-to-analog converter (DAC) 134.

A head position detector generally designated by the reference numeral 140 is physically interconnected to an output shaft 144 of the head motor 38 and may be of a photointerrupter type, for example. Specifically, the detector 140 includes a plate 142 which is formed with a slot 146 and mounted on the output shaft 144 of the head motor 38. A light source which includes a light-emitting diode 148 or the like is located at one side of the slotted plate 142. Located at the other side of the slotted plate 142 is a photodiode 150 or the like. The output 42 of the light-sensitive device 150 is interconnected to the peak position detector 40. In this construction, as the slotted plate 142 on the motor output shaft 144 is rotated, light from the light-emitting device 148 becomes incident to the light-sensitive device 150 every time the slot 146 is brought into alignment with an optical axis 152 which extends between the devices 148 and 150. Then, the light-sensitive device 150 produces a signal which is fed to the output terminal 42 to be used for the detection of a head position.

Figure 3:
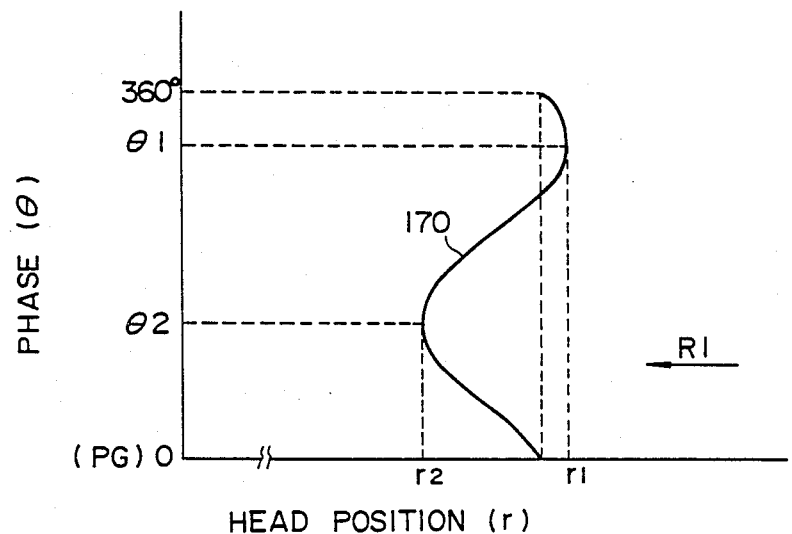
FIG. 3 is a graph illustrating a specific example of tracking methods which may be practiced with the device of FIG. 1.

A first tracking method which may be practiced with the embodiment of the present invention as shown in FIGS. 1 and 2 will now be described. While the head 32 is sequentially transported in one radial direction of the disk 10 such as indicated by an arrow $R_1$, FIG. 2, a peak of an envelope of a certain track on the disk 10 is searched for. For example, as shown in FIG. 3, when the head 32 is transported inwardly along the radius of the disk 10, an envelope peak is detected for the first time at a particular position where the rotation angle, or phase $\theta$, of the disk 10 assumes a certain value. This position is representative of an angle $\theta 1$ in a direction in which the disk 10 is most offset outwardly. The head position r1 of this instant is stored. It is to be noted that basic point for the measurement of the phase angle $\theta$ comprises a predetermined position such as where a timing pulse PG is detected.

Subsequently, the envelope detection phase is advanced or reverted 180 degrees from the phase angle $\theta$ detected as stated above to a phase angle $\theta 2$. The head 32 is further transported in the same direction while detecting the envelope at the phase angle $\theta 2$. As shown in FIG. 3, the phase angle $\theta 2$ corresponds to a position at which the head 32 detects an envelope peak at the innermost side of the track.

As an envelope peak is detected at the phase angle $\theta 2$, a head position r2 which corresponds to the phase angle $\theta 2$ and the previously stored head position r1 are subjected to an arithmetic operation for producing their mean value. Then, the head 32 is transported to a position which is represented by the mean value. Thereafter, the head 32 reproduces a signal out of the track of the disk 10 with the position mentioned above defining the center of the track. For the playback of the disk 10, a static tracking is performed with the head 32 fixedly held at the particular head position represented by the means value of the two peak positions. Another possible implementation is the so-called dynamic tracking in which the head 32 is oscillated in accordance with the degree of eccentricity.

Figure 4A:
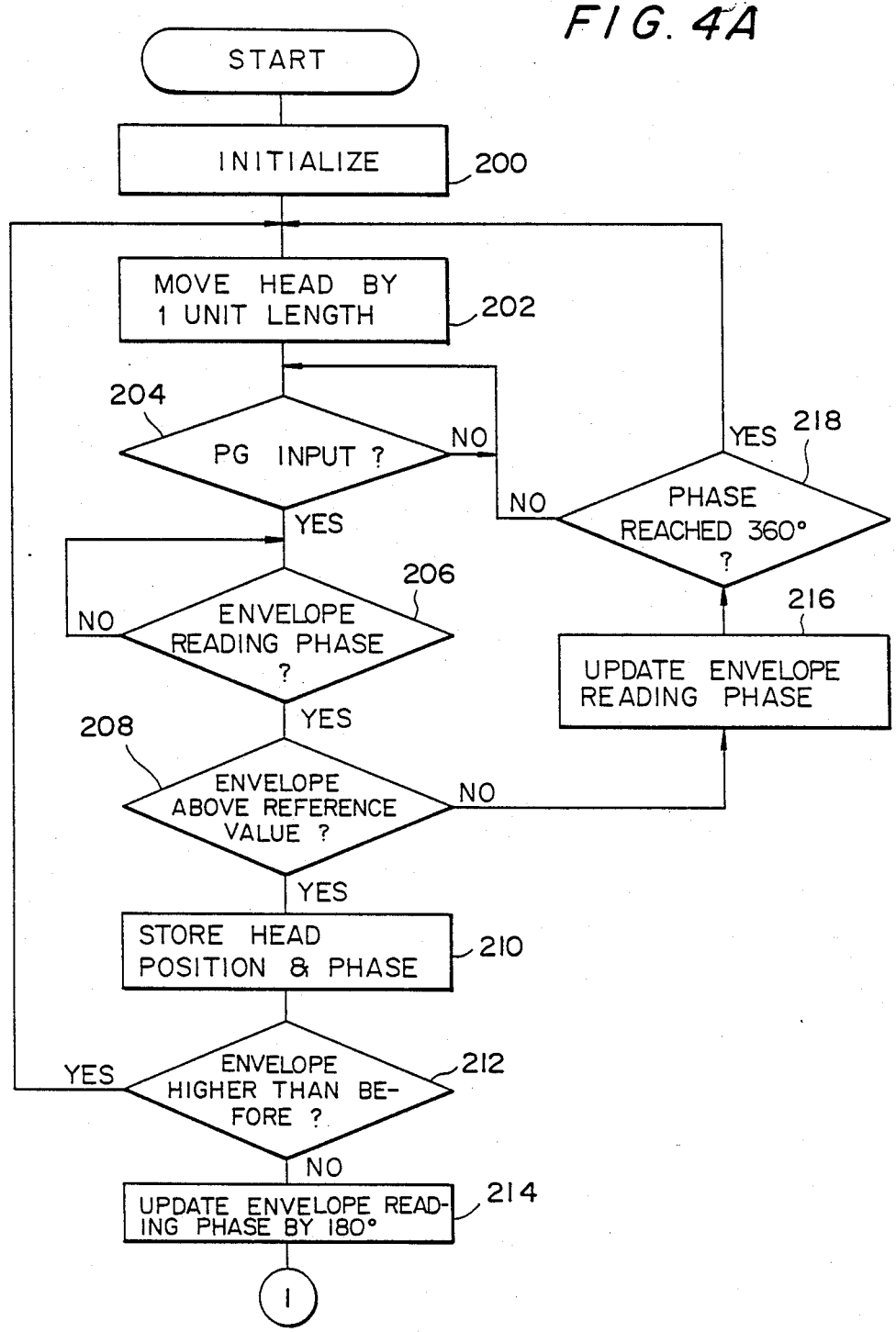
FIGS. 4A and 4B are flowcharts demonstrating a tracking procedure associated with the method of FIG. 3.
Figure 4B:
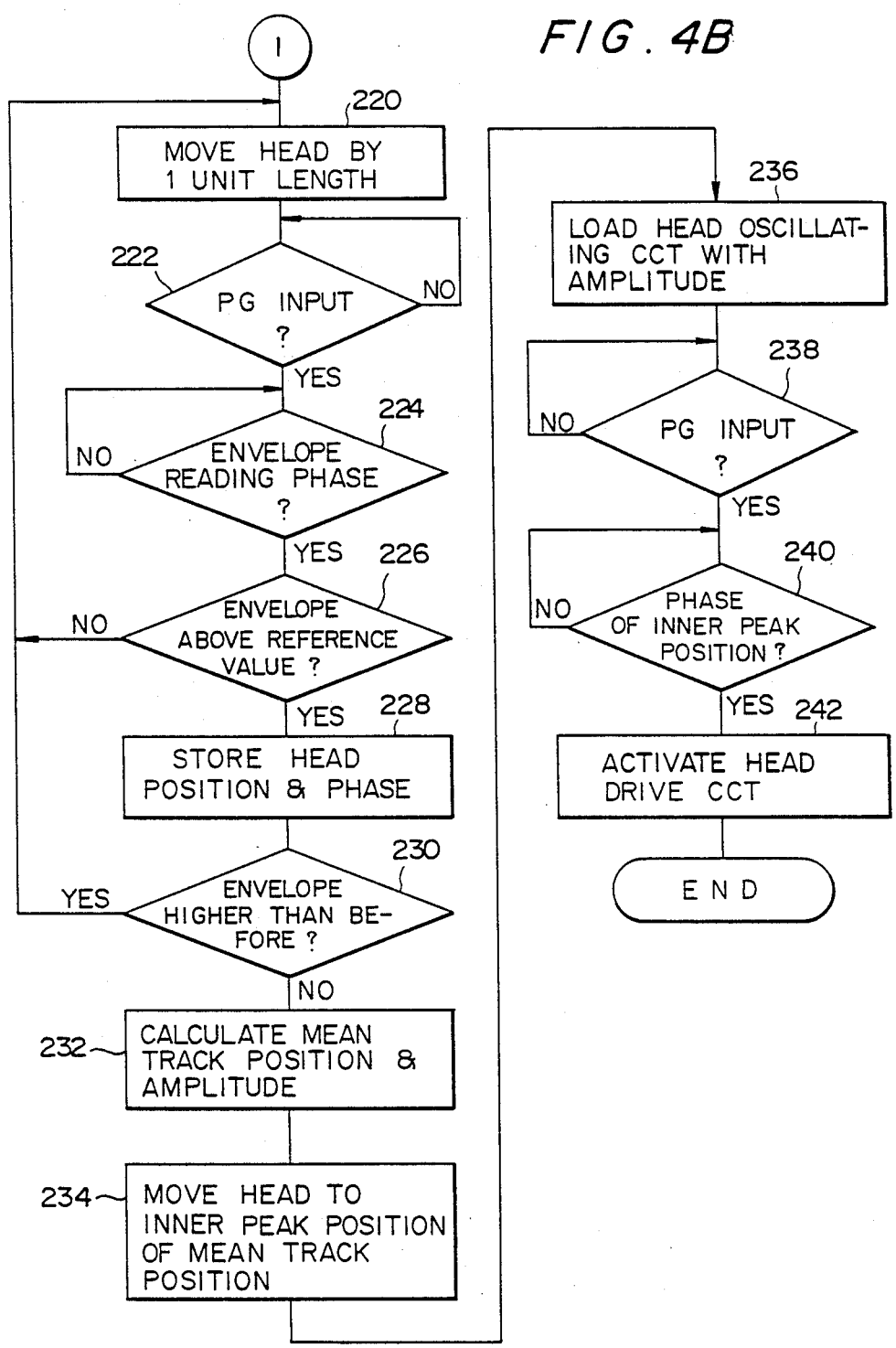

Referring to FIGS. 4A and 4B, there is shown an exemplary procedure in which the tracking device of the present invention performs dynamic tracking with the principle of FIG. 3. Mainly, the illustrative procedure is executed by the controller 22, phase detector 28, peak position detector 40, track position calculator 64 and other functional sections.

In FIGS. 4A and 4B, when a tracking command is entered on the operating section 66, the controller 22 initializes a register, counter and other circuits which are associated with the tracking operation (200). Then, the controller 22 controls the motor driver 71 to transport the head 32 by one unit length in the forward direction R1 as far as a position which is relatively close to a selected track (202). As the phase generator 24 produces a timing pulse PG from the disk 10 which is rotating at a predetermined speed (204), the device starts detecting a peak of the envelope of the signal stored in the desired track. Specifically, the peak detection is continued by advancing the phase angle $\theta$ which is based from the position where the timing pulse PG has appeared (206, 216 and 218), until the envelope exceeds the reference level of the comparator 54 and a signal indicative of such an occurrence arrives at the peak position detector (208).

Upon detection of an envelope level above the reference value, data representative of the position r1 of the head 32 at which the level is detected is fed from the head support mechanism 36 to the peak position detector 40 while, at the same time, data representative of the rotational phase angle $\theta 1$ of the disk 10 of that instant is fed from the phase detector 28 to the peak position detector 40. These data are temporarily loaded in the store 68 (210) and are updated continuously until an envelope peak becomes detected at the phase angle $\theta 1$ (212).

As an envelope peak is detected, the peak position detector 40 advances or reverts the envelope reading phase by 180 degrees from the phase $\theta 1$ and then repeats the detection (220 to 230). When an envelope level is detected at the phase angle $\theta 2$, the track position calculator 64 produces an arithmetic mean of the position r2 of the head 32 corresponding to the second peak level and the position r1 previously loaded in the store 68, i.e. an intermediate position between the positions r1 and r2. This intermediate position is regarded as being representative of a position of the track. Also, a difference between the positions r1 and r2, i.e., r1−r2 is produced and determined as an amplitude of oscillation of the head 32 (232).

Next, the controller 22 activates the motor driver 71 to transport the head 32 to the inner peak position r2 (234). This is because the arm 104 of the head support mechanism 36 is constantly biased by the spring 112 such that the head 32 is located inwardly with respect to the radius of the disk 10 and movable outwardly therefrom. The amplitude calculated at the step 232 is loaded in the head oscillating circuit 70 (236).

Upon the lapse of a period of time (240) corresponding to the phase angle $\theta 2$ after the appearance of the next timing pulse PG (238), the controller 22 activates the head oscillation circuit 70 (242) which in turn causes the head 32 to oscillate as indicated by a double-headed arrow B in FIG. 2. Consequently, while the disk 10 is rotated, the head 32 changes its position in such a manner as to follow an envelope 170 as shown in FIG. 3 of the signal which is stored in the track of the disk 10, thereby accomplishing adequate dynamic tracking.

Figure 5:
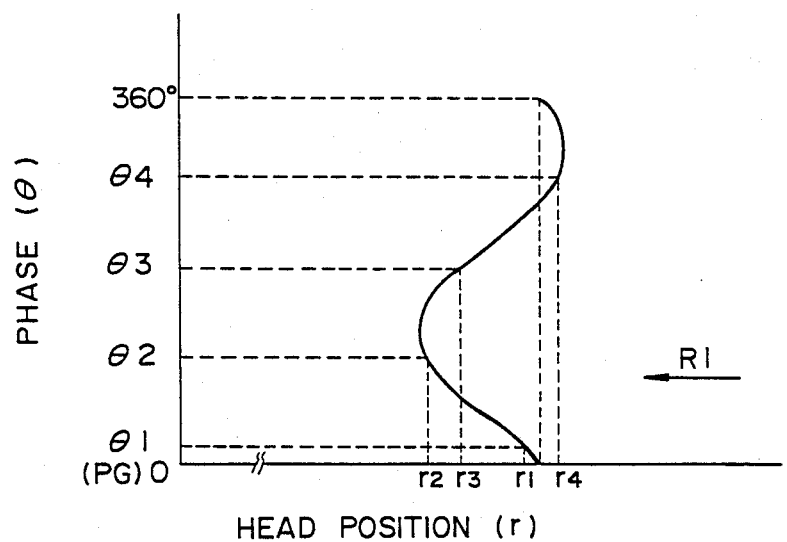
FIG. 5 is a graph illustrating another specific example of tracking methods which may be practiced with the device of FIG. 1.

Referring to FIG. 5, another tracking method which may be practiced with the tracking device of FIGS. 1 and 2 is shown. The head 32 is transported in one radial direction of the disk 10 such as the inward direction R1, FIG. 2, so as to detect a peak of an envelope from a desired track, similar to the tracking method of FIG. 3. While the head 32 is transported inwardly, a peak of an envelope of the signal stored in the track is detected by sensing the envelope at a particular phase, or rotation angle, $\theta 1$. A position r1 of the head 32 at this instant is memorized. The phase angle $\theta$ is based from a predetermined position at which a timing pulse PG is detected, and the phase angle $\theta 1$ at which an envelope peak is detected for the first time may be substantially the same as a position at which a timing pulse PG is generated.

Subsequently, the envelope peak detection phase is advanced or reverted by 90 degrees from the phase angle $\theta 1$ so that the head 32 is further transported in the same direction or transported in the other direction while sensing the envelope at a phase angle $\theta 2$. In this manner, as shown in FIG. 5, an envelope peak is detected at each of four different phase angles during the inward or outward movement of the head 32.

Assume that envelope peaks have been detected at four phase angles $\theta 1$, $\theta 2$, $\theta 3$ and $\theta 4$, as shown in FIG. 5. Then, head positions r1 to r4 associated with the phase angles $\theta 1$ to $\theta 4$, respectively, are subjected to an arithmetic operation to produce their mean, and the head 32 is transported to a position which is represented by the mean. Thereafter, the head 32 starts reproducing a signal from of the disk 10 with that position defining the center. Again, while the basic implementation for the reproduction of a signal is static tracking, there may be effected dynamic tracking in which the head 32 is displaced according to the degree of eccentricity.

As shown in FIG. 5, when the center of rotation of the disk 10 is offset relative to the center of a track on the disk 10, the positions r1 to r4 of the envelope peaks which are detected at the four phase angles $\theta 1$ to $\theta 4$ are located in pairs with respect to the center of the track, each position of the pair being different in phase by 180 degrees from each other. It follows that an average track position r0 where the envelope is sensed can be obtained by producing an intermediate value of the paired positions r1 and r3 and that of the paired positions r2 and r4 and calculating a track position based on the intermediate values, as represented by $$r0 = [(r1 + r3)/2 - (r2 + r4)/2]/2 + (r2 + r4)/2$$
$$= (r1 + r2 + r3 + r4)/4$$

If the head 32 is moved to the position r0, it is capable of sensing a signal from a track of the disk 10 constantly at a position which is relatively close to the envelope of the signal, despite the track being offset.

While the tracking method of FIG. 5 is described as sensing an envelope peak at four different phase angles, the number of phase angles to read envelope peaks may generally be 2 or n which is greater than 2. That is, the effect will remain the same even if an envelope peak is sensed at n positions per rotation of the disk 10 which are essentially spaced apart by equal amounts in terms of phase and, then, the resulting n head positions are processed to produce an arithmetic mean. Preferably, the number n is an even number.

Figure 6A:
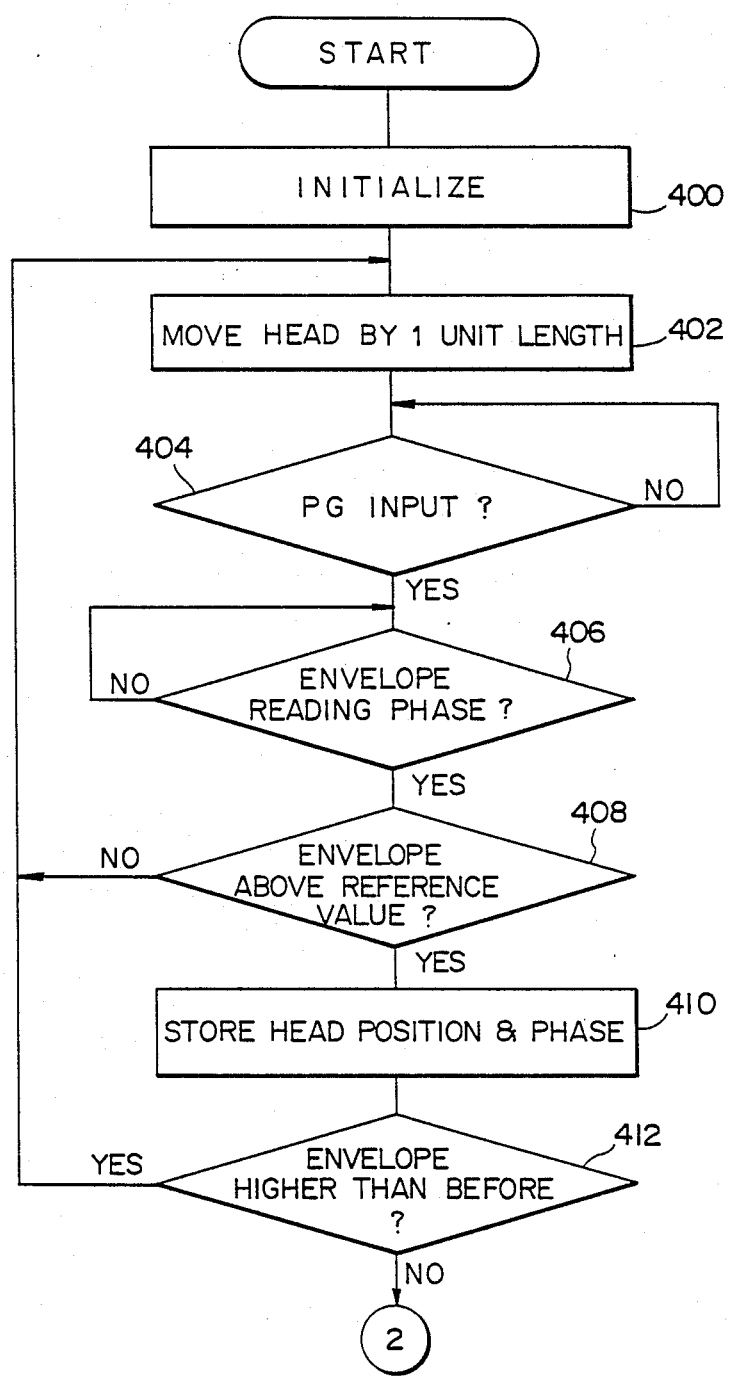
FIGS. 6A to 6C are flowcharts demonstrating a tracking procedure associated with the method of FIG. 5.
Figure 6B:
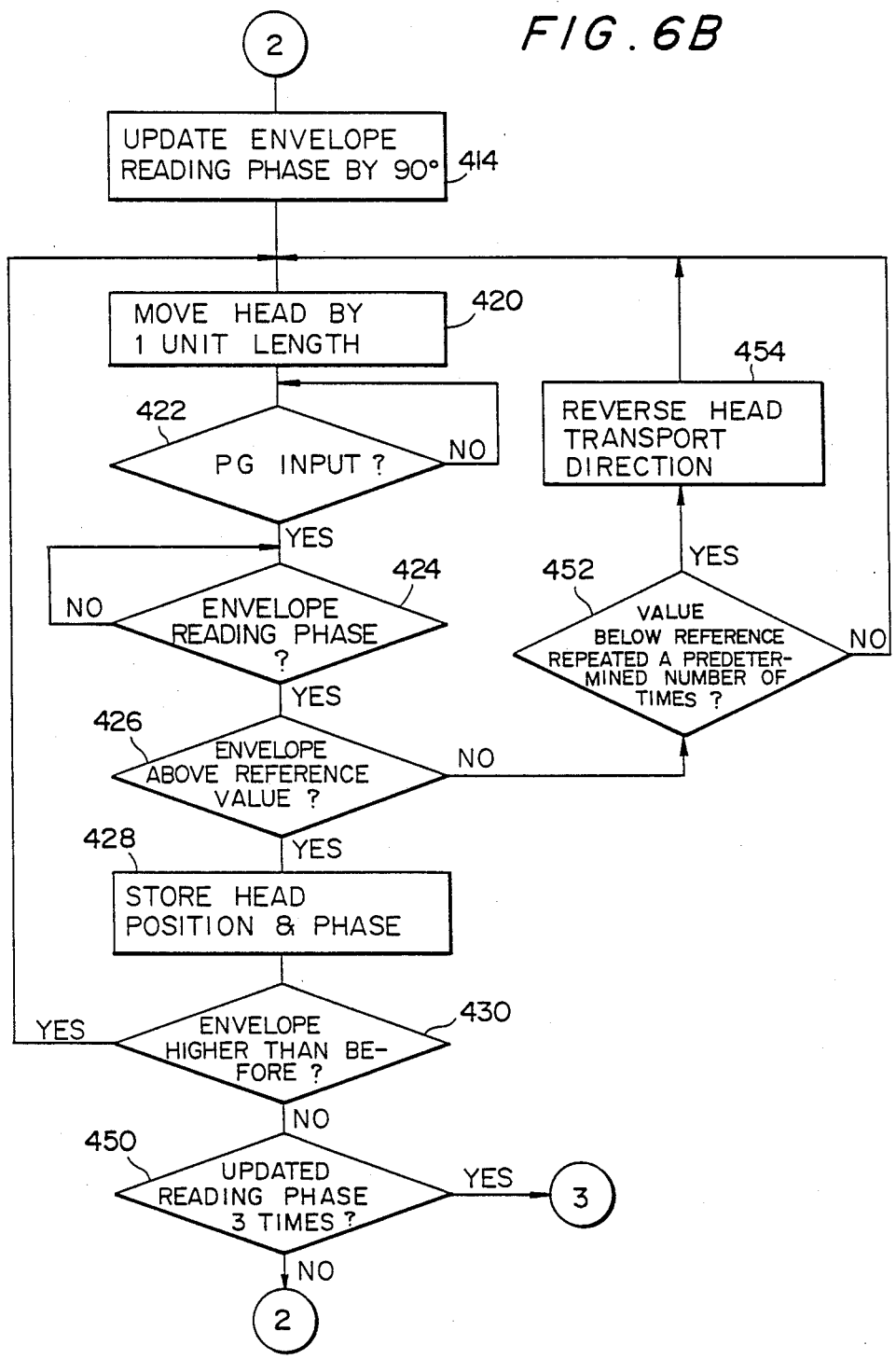
Figure 6C:
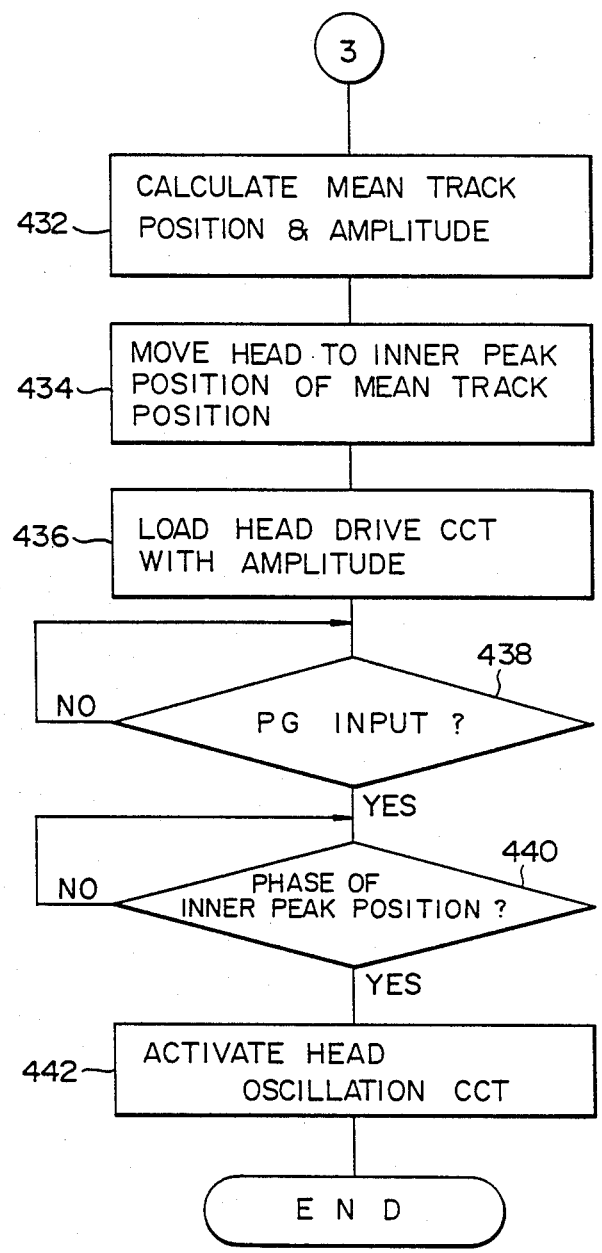

Referring to FIGS. 6A to 6C, there is shown an exemplary procedure in which the device of FIGS. 1 and 2 perform dynamic tracking on the basis of the principle as stated above with reference to FIG. 5. The procedure of FIGS. 6A to 6C, like that of FIGS. 4A and 4B, is executed mainly by the controller 22, phase detector 38, peak position detector 40, track position calculator 64 and other functional sections.

When a tracking command is entered on the operating section 66, the controller 22 initializes a register, a counter and other circuits which are associated with tracking 400. Then, the controller 22 controls the motor driver 71 to transport the head 32 by a unit length in, for example, the forward direction R1 to a position which is close to a desired track (402). As the phase senses a timing pulse PG from the disk 10 which is rotating at a constant speed (404), the head 32 is caused to start sensing a peak of an envelope at a phase which is advanced by a predetermined phase angle from the phase where the signal PG has been detected (406). It will be needless to mention that the predetermined phase angle stated above may even be zero, that is, the head 32 may be caused to start sensing a peak at the same timing as the appearance of a timing pulse PG.

When the envelope being sensed becomes greater than the reference level of the comparator 54 (408), a position r1 of the head 32 at that instant is fed from the head support mechanism 36 to the peak position detector 40 and, at the same time, data on a rotational phase angle $\theta1$ of the disk 10 at that instant is fed from the phase detector 28. These data are temporarily stored in the store 68 (410) and, until a peak of the envelope becomes detected at the phase angle $\theta1$ (412), they are updated continuously.

Upon detection of a peak, the peak position detector 40 advances or reverts the envelope reading phase by 90 degrees from the phase $\theta1$ (414), followed by another peak detection (420 to 430). When no peak is sensed even after the head 32 has been transported in the same direction as before, i.e., the forward direction R1 to perform peak detection a predetermined number of times such as twice (452), the transport direction of the head 32 is reversed (454), followed by the same procedure as described so far.

In this manner, an envelope peak is sensed at four positions $\theta1$ to $\theta4$ which in this particular example are deviated in phase sequentially each by 90 degrees. When peak detection at a position which is advanced or retarded in phase by 270 degrees from the initial position is completed (450), the track position calculator 64 produces an arithmetic mean of the four head positions r1 to r4 and determines it as a position r0 of the track concerned. Simultaneously, the calculator 64 produces a difference between the largest or outermost one of the four head positions r1 to r4, position r4 in this example, and the smallest or innermost one of the same, position r2 in this example, the difference being regarded as an amplitude of oscillation of the head 32 (432).

Next, the controller 22 activates the motor driver 71 to transport the head 32 to the innermost peak position r2 (434). This is derived from the particular construction of the head support mechanism 36 in which the arm 104 is constantly biased by the spring 112, as previously described in relation to the procedure of FIGS. 4A and 4B. The amplitude calculated at the step 432 is loaded in the head oscillation circuit 70 (436). As a period of time corresponding to the phase angle $\theta2$ expires after the generation 438 of the next timing pulse PG (440), the controller 22 enables the head oscillation circuit 70 (442). This causes the head 32 to oscillate as indicated by the arrow B in FIG. 2 and, thereby, effects adequate dynamic tracking as previously described.

In summary, it will be seen that the present invention provides a tracking device which does not perform tracking control by simple envelope peak detection, but instead senses an envelope at a plurality of phase angles per track and transports a magnetic head to a particular position which is calculated by averaging head positions at which peaks of the envelope are detected. Hence, the tracking device of the present invention is capable of adequately reproducing a signal stored in a rotary recording medium even if the recording medium is offset. When applied to dynamic tracking in particular, the device will minimize the amplitude over which the head oscillates and, thereby, allow a minimum of damage to a head support arrangement to occur while suppressing generation of noise.

Various modifications will become possible for those skilled in the art after receiving the teachings of the present disclosure without departing from the scope thereof. For example, while the embodiment of the present invention has been shown and described in relation to dynamic tracking, it may be designed for static tracking. Specifically, as regards static tracking, the arrangement for oscillation which is installed in the head support mechanism 34 will be omitted, and the head 34 will be transported to a mean position of a plurality of peak positions to perform tracking fixedly there.

What we claim is:

1. Apparatus for tracking a rotary recording medium comprising:
   a playback head for reading a signal from any one of a plurality of tracks formed on the recording medium, which is rotating at a predetermined constant speed, such that a beginning and an end of a recording in each of said plurality of tracks coincide with each other;
   head support means for supporting said head so as to be movable along the recording medium in a radial direction;
   envelope detecting means for detecting an envelope of a signal read from one of said plurality of tracks of the recording medium by said head;
   position detecting means for detecting a radial position of said head relative to the recording medium;
   phase detecting means for detecting a rotation phase angle of the recording medium; and
   control means operative in response to said envelope detecting means, said position detecting means and said phase detecting means for controlling said head support means to move said head to a position where a desired one of said plurality of tracks is located;
   said control means including means for storing a first position of said head detected by said position detecting means and a first rotation phase angle detected by said phase detecting means in response to a peak of an envelope of a signal detected by said envelope detecting means, means for storing a second position of said head detected by said position detecting means in response to a peak of an envelope of said signal detected by said envelope detecting means at a second rotation phase angle 180° removed from said first rotation phase angle, as detected by said phase detecting means, and means for determining a mean position of said first and second positions and controlling said head support means to move said head to said mean position.

2. Apparatus in accordance with claim 1, wherein said head support means includes oscillating means for causing said head supported by said head support means to oscillate in said radial direction;

said control means including means for controlling said oscillating means to cause said head to oscillate over an amplitude which is substantially equal to a distance between said first and second positions of said head in synchronism with the rotation of said recording medium.

3. Apparatus in accordance with claim 1, wherein said recording medium comprises a magnetic disk.

4. Apparatus for tracking a rotary recording medium comprising:

a playback head for reading a signal from any one of a plurality of tracks formed on the recording medium, which is rotating at a predetermined constant speed, such that a beginning and an end of a recording in each of said plurality of tracks coincide with each other;

head support means for supporting said head so as to be movable along the recording medium in a radial direction;

envelope detecting means for detecting an envelope of a signal read from one of said plurality of tracks of the recording medium by said head;

position detecting means for detecting a radial position of said head relative to the recording medium;

phase detecting means for detecting a rotation phase angle of the recording medium; and control means operative in response to said envelope detecting means, said position detecting means and said phase detecting means for controlling said head support means to move said head to a position where a desired one of said plurality of tracks is located;

said control means including means for storing a first position of said head detected by said position detecting means and a first rotation phase angle detected by said phase detecting means in response to a first peak of an envelope of a signal detected by said envelope detecting means as said head is moved in a desired direction, means for storing a second position of said head in response to a last peak of said envelope detected by said envelope detecting means when said phase detecting means detects a second rotation phase angle 180° removed from said first rotation phase angle, and means for determining an intermediate position between said first and second positions and controlling said head support means to move said head to said intermediate position.

5. Apparatus in accordance with claim 4, further comprising oscillating means for causing said head supported by said head support means to oscillate in said radial direction;

said control means controlling said oscillating means to cause said head to oscillate over an amplitude which is substantially equal to a distance between said first and second positions of said head in synchronism with the rotation of said recording medium.

6. Apparatus in accordance with claim 4, wherein said recording medium comprises a magnetic disk.

7. Apparatus for tracking a rotary recording medium comprising:

a playback head for reading a signal from any one of a plurality of tracks formed on the recording medium, which is rotating at a predetermined constant speed, such that a beginning and an end of a recording in each of said plurality of tracks coincide with each other;

head support means for supporting said head so as to be movable along the recording medium in a radial direction;

envelope detecting means for detecting an envelope of a signal read form one of said plurality of tracks of the recording medium by said head;

position detecting means for detecting a radial position of said head relative to the recording medium;

phase detecting means for detecting a rotation phase angle of the recording medium; and control means operative in response to said envelope detecting means, said position detecting means and said phase detecting means for controlling said head support means to move said head to a position where a desired one of said plurality of tracks is located;

said control means including means for storing a position of said head each time a peak of an envelope is detected by said envelope detecting means in response to the detection of each of at least four predetermined rotation phase angles by said phase detecting means, and means for determining a mean position from the positions stored in said means for storing and controlling said head support means to move said head to said mean position.

8. Apparatus in accordance with claim 7, wherein said head support means includes oscillating means for causing said head supported by said head support means to oscillate in said radial direction;

said control means controlling said oscillating means to cause said head to oscillate over an amplitude which is substantially equal to a distance between two extreme ones of said positions of said head detected with respect to said radial direction and in synchronism with the rotation of said recording medium.

9. Apparatus in accordance with claim 7, wherein said recording medium comprises a magnetic disk.

10. Apparatus in accordance with claim 9, wherein said plurality of phase angles are spaced by 90 degrees from each other in an intended direction of rotation of said disk.

* * * * *